(12) United States Patent
Hellholm et al.

(10) Patent No.: US 10,407,114 B2
(45) Date of Patent: Sep. 10, 2019

(54) ATTACHMENT DEVICE FOR TRACK SUPPORT BEAM OF TRACKED VEHICLE

(71) Applicant: BAE Systems Hägglunds Aktiebolag, Örnsköldsvik (SE)

(72) Inventors: Björn Hellholm, Arnäsvall (SE); Alexandra Rietz, Örnsköldsvik (SE); Julius Palmqvist, Malmö (SE)

(73) Assignee: BAE Systems Hägglunds Aktiebolag, Örnsköldsvik (SE)

( * ) Notice: Subject to any disclaimer, the term of this patent is extended or adjusted under 35 U.S.C. 154(b) by 107 days.

(21) Appl. No.: 15/524,616

(22) PCT Filed: Nov. 2, 2015

(86) PCT No.: PCT/SE2015/051154
§ 371 (c)(1),
(2) Date: May 4, 2017

(87) PCT Pub. No.: WO2016/072914
PCT Pub. Date: May 12, 2016

(65) Prior Publication Data
US 2017/0313367 A1    Nov. 2, 2017

(30) Foreign Application Priority Data

Nov. 7, 2014    (SE) ...................................... 1451338

(51) Int. Cl.
*B62D 55/104*    (2006.01)
*B62D 55/084*    (2006.01)
(Continued)

(52) U.S. Cl.
CPC ........... *B62D 55/104* (2013.01); *B62D 55/06* (2013.01); *B62D 55/084* (2013.01);
(Continued)

(58) Field of Classification Search
CPC . B62D 55/104; B62D 55/0842; B62D 55/116
See application file for complete search history.

(56) References Cited

U.S. PATENT DOCUMENTS 1,514,187 A    11/1924    Wickersham
2,988,159 A    6/1961    Weber
(Continued)

FOREIGN PATENT DOCUMENTS

CA    1037528 A    8/1978
CN    202175123 U    3/2012
(Continued)

OTHER PUBLICATIONS

Extended European Search Report (includes Supplementary European Search Report and Search Opinion) received for European Patent Application No. 15857163.8, dated Jun. 7, 2018, 8 pages.
(Continued)

*Primary Examiner* — Tony H Winner
(74) *Attorney, Agent, or Firm* — Morrison and Foerster LLP

(57) ABSTRACT

In one aspect of the present invention is provided an attachment device (100) for attachment of a trailing arm (54a) to a track support beam (22) intended to be connected, via said trailing arm (54a), to a center beam (30, 32) or other structural element situated between two track assemblies (21) of a tracked vehicle (10). The attachment device (100) is secured to the track support beam (22) and configured to attach the trailing arm (54a) to the track support beam (22) via an axis (X2) running above and substantially centrally along an upper side of the track support beam (22), in the longitudinal direction of the track support beam. In this way, a robust, structurally strong, suspension-admitting attachment device that is easy to manufacture and assemble is achieved. In another aspect of the invention is provided a tracked vehicle (10) comprising such an attachment device
(Continued)

(100) and in a further aspect of the invention a method of manufacturing a track support beam (22) comprising such an attachment device (100).

15 Claims, 6 Drawing Sheets

(51) Int. Cl.
*B62D 55/112* (2006.01)
*B62D 55/116* (2006.01)
*B62D 55/06* (2006.01)
*B62D 55/32* (2006.01)
*B62D 55/065* (2006.01)
*B60P 1/54* (2006.01)

(52) U.S. Cl.
CPC ........ *B62D 55/0842* (2013.01); *B62D 55/116* (2013.01); *B62D 55/1125* (2013.01); *B62D 55/32* (2013.01); *B60P 1/54* (2013.01); *B62D 55/065* (2013.01)

(56) References Cited

U.S. PATENT DOCUMENTS

| | | | |
|---|---|---|---|
| 3,825,088 | A | 7/1974 | Copeland |
| 5,494,125 | A | 2/1996 | Gustin et al. |
| 6,209,669 | B1 * | 4/2001 | Young .................. B62D 55/06 180/41 |
| 2003/0116366 | A1 | 6/2003 | Simmons |
| 2003/0222432 | A1 | 12/2003 | Bowers et al. |
| 2007/0169968 | A1 | 7/2007 | Todd et al. |
| 2008/0156548 | A1 | 7/2008 | Mallette et al. |
| 2010/0237574 | A1 * | 9/2010 | Allaire .................... B60G 5/02 280/28.5 |
| 2011/0037312 | A1 * | 2/2011 | Geraschenko ....... B62D 55/104 305/141 |
| 2011/0291472 | A1 * | 12/2011 | Holman ................ B60G 7/001 305/133 |
| 2013/0033013 | A1 | 2/2013 | Voisine |
| 2013/0277125 | A1 * | 10/2013 | Moser ............... B62D 55/0842 180/9.52 |
| 2014/0138168 | A1 * | 5/2014 | Steltz .................... B62D 55/10 180/9.1 |
| 2015/0321708 | A1 * | 11/2015 | Van Mill ............. B62D 55/305 280/28.5 |
| 2017/0210434 | A1 * | 7/2017 | Brazier ................ B62D 55/104 |
| 2018/0162465 | A1 * | 6/2018 | Visscher .................. B60F 5/00 |
| 2018/0251171 | A1 * | 9/2018 | Thomas ................. B62D 55/24 |

FOREIGN PATENT DOCUMENTS

| | | |
|---|---|---|
| GB | 128280 | 6/1919 |
| WO | 2005/123489 A1 | 12/2005 |
| WO | 2014/182235 A1 | 11/2014 |

OTHER PUBLICATIONS

International Preliminary Report on Patentability received for PCT Patent Application No. PCT/SE2015/051154, dated May 18, 2017, 9 pages.

International Search Report and Written Opinion received for PCT Patent Application No. PCT/SE2015/051154, dated Feb. 18, 2016, 13 pages.

* cited by examiner

ATTACHMENT DEVICE FOR TRACK SUPPORT BEAM OF TRACKED VEHICLE

CROSS REFERENCE TO RELATED APPLICATIONS

This application is a U.S. National Phase patent application of PCT/SE2015/051154, filed Nov. 2, 2015, which claims priority to SE 1451338-6, filed Nov. 7, 2014, the disclosures each of which are hereby incorporated by reference in their entirety.

TECHNICAL FIELD

The present invention relates to tracked vehicle(s) and suspension of track assemblies of tracked vehicle(s). In particular, the invention relates to an attachment device for attaching a trailing arm to a track support beam intended to be connected, via said trailing arm, to a center beam or other structural element situated between two track assemblies of a tracked vehicle. The invention also relates to a tracked vehicle and a method of manufacturing a track support beam.

BACKGROUND ART

Tracked vehicles are often provided with a track assembly pair consisting of two track assemblies disposed on a respective side of the vehicle body.

The present invention concerns the type of tracked vehicle(s) where support wheels (against which the track runs) and drive wheels (which drive the track) of the track assemblies are rotatably journaled in a track support beam, which in turn is suspended in the vehicle body and typically in a so-called chassis beam or center beam of the vehicle body. This is different from tracked vehicle(s) where drive wheels and support wheels are journaled directly to the vehicle body and therefore has no separate track support beam. Thus, the track support beam constitutes a structural element, comprised in certain tracked vehicle(s), arranged to support a ground-contacting endless track running about the track support beam for propulsion of the tracked vehicle.

Tracked vehicle(s) of the type to which the present invention is derived typically comprises two track assemblies, each one comprising a respective track support beam, where each track support beam is connected to, or suspended in an intermediate chassis beam via construction elements, herein referred to as trailing arms.

The part of the track assembly suspension that the present invention mainly refers to is the actual attachment between the track support beam and the trailing arm connecting the track support beam to the chassis beam or other part of the vehicle body.

There are many alternatives on track assembly suspensions and attachments between track support beams and chassis beams and the requirements of these naturally depends partly on the type of tracked vehicle(s).

In conventional tracked vehicles where the drive motor is mounted in the vehicle chassis and typically supported by a chassis beam the connection between the chassis beam and track support beam have to comprise mechanical/hydraulic solutions for the transmission of drive torque to the drive wheels of the track assembly. Examples of such conventional solutions are shown in inter alia US 2007169968 and US 2008156548.

In more unconventional types of tracked vehicles, such as the tracked vehicle disclosed in the present application, the drive motor driving the drive wheel is integrated in the track assembly, wherein each track assembly thus constitutes an independent drive unit. In this case it is typically enough that control signals are transmitted from a central control unit on the vehicle body to the respective track assembly. As the mechanical/hydraulic solutions for torque transmission are not necessary in this case, the suspension devices can appear substantially different. The present invention will be described in the context of such a tracked vehicle, which tracked vehicle is more detailed described in the international patent application PCT/SE2014/050563. Other examples of tracked vehicle(s) with track assemblies that can be seen as independent drive units are described inter alia in patent applications GB128280A, US2003116366 and CN202175123U. In GB128280A, however, the drive wheels are journaled in the vehicle body, such that the track assembly therein cannot be said to constitute an independent drive unit.

Although the invention particularly relates to a suspension device for track assemblies of the kind described above, i.e. for track assemblies constituting independent drive units, the invention is applicable to all types of track assemblies comprising a track support beam to be connected to a chassis beam or other structural element constituting part of a vehicle body of a tracked vehicle.

The attachment device for attachment of the trailing arm to the track support beam is a key component of the track support beam and constitutes one of the points in which the track support beam carries the load of the vehicle body. This sets high demands on the structural strength of the attachment.

Known types of attachments between trailing arms and track support beams suffer inter alia of that they are weak in construction, which reduces the life expectancy and increases the service needs of the tracked vehicle. Furthermore, they are not formed to allow adequate suspension between the track support beam and the vehicle body (chassis beam), which reduces the comfort during propulsion of the vehicle and/or reduces the life expectancy/increases the service needs of the vehicle. Typically, they are also complex in construction, which makes them difficult and expensive to manufacture and assemble.

Accordingly, there is a need for improvements within the field of suspension of track assemblies of tracked vehicle(s), and in particular in the field of attachment devices for attachment of a trailing arm adapted to couple a track support beam to a chassis beam or other structural element of a vehicle body.

SUMMARY OF THE INVENTION

An object of the present invention is to provide an attachment device solving or alleviating at least one of the above mentioned problems.

In particular it is an object of the invention to provide a robust, structurally strong and suspension-admitting attachment device that is also easy to manufacture and assemble.

These and other objects, which will appear from the following description, are achieved by an attachment device for attachment of a trailing arm to a track support beam intended to be connected, via said trailing arm, to a center beam or other structural element situated between two track assemblies of a tracked vehicle.

These and other objects are also achieved by a tracked vehicle and a method of manufacturing a track support beam.

In one aspect of the present disclosure is provided an attachment device for a track support beam intended to be attached, via a trailing arm, to a center beam or other structural element situated between two track assemblies of a tracked vehicle, wherein the attachment device is secured to the track support beam and configured to attach the trailing arm to said track support beam via an axis substantially parallel to the track support beam, i.e. to the main direction of extension or longitudinal direction of the track support beam. The fact that the trailing arm is attached to the track support beam via an axis substantially parallel to the track support beam means that the surface of engagement between the trailing arm and the track support beam has a main direction of extension which runs essentially parallel to the longitudinal direction of the track support beam. The effect of this is that the structural strength of the track support beam is increased with such geometry than with other geometries on the surface of engagement, which is due to that the parallel axis gives additional structure to the track support beam. Typically, the trailing arm and the track support beam are substantially perpendicularly arranged in relation to each other, meaning that the axis through which the trailing arm is attached to the track support beam generally also is substantially perpendicular to the main direction of extension of the trailing arm.

Furthermore, the attachment device is configured such that said axis runs above and substantially centrally along with the upper side of the track support beam, in the longitudinal direction of the track support beam. This means that this axis is in substantially the same vertical plane as the center of mass of the track support beam, which has the effect of giving the structure a greater stability, for example, as compared with solutions in which the trailing arm in some way is attached to the inside of the track support beam. The fact that the axis runs above the track support beam further has the effect that the structure of the track support beam is strengthened because of the additional contact above the cross section in the vertical direction. The axis that is gripped by the trailing arm thus constitutes an additional structural element in the longitudinal direction of the track support beam, which increases the stability and the structural strength in directions transverse to the longitudinal direction of the track support beam.

The attachment device is thus configured so that the axis through which the trailing arm is attached to the track support beam runs above and substantially centrally along an upper side of the track support beam, in the longitudinal direction of the track support beam.

Advantageously, the attachment device is configured to pivotally attach the trailing arm to the track support beam via said axis. This has the effect of allowing the pivotal movement (rotational movement) between the trailing arm and the track support beam, which in turn enables resilient attachment of the track support beam to the center beam or other structural element of the vehicle body. Pivotally attaching the trailing arm to the track support beam via an axis parallel to the track support beam thus provides a resistant, robust and shockproof connection between the trailing arm and the track support beam.

Said axis is typically configured to engage in a bearing provided cavity in said trailing arm to provide said pivotal attachment. In one embodiment, one end of the trailing arm is provided with a hole which runs through the trailing arm in a substantially horizontal direction transverse to the main longitudinal extension of the trailing arm, wherein said axis of the attachment device is constituted by a pin configured to run through said hole to thereby provide said pivotal attachment of the trading arm to the track support beam. The hole through the trailing arm may for example be provided with a ball joint bearing for the rotatable journaling of the axis pin running therethrough.

In one embodiment, the attachment device is constituted by a part made of solid material, such as castings or forgings, configured for attachment to the track support beam by being inserted into a recess in the track support beam, typically a through-recess, wherein it is being secured to the track support beam by for example welding. This has the effect of further increasing the structural strength of the track support beam since it is been found that the solid material further strengthens the structure of the track support beam.

In one embodiment, the solid part constituting the attachment device also comprises a recess, typically a through-recess, for journaling a support wheel, typically by journaling one end of a rocker arm, the other end of which supports said support wheel. The support wheel thus supported by the attachment device is, when the attachment device has been secured to the track support beam, intended to constitute one of a plurality of support wheels supported by the track support beam. This has the effect to prevent that unused area arise on the track support beam due to the insertion of the solid part, wherein a compact construction is obtained. The recess is typically substantially cylindrical with a longitudinal direction running substantially horizontally transverse the longitudinal direction of the track support beam when the solid part is secured to the track support beam.

In one embodiment, the recess of the solid part is configured to accommodate a torsion spring for resiliently journaling said rocker arm supporting said support wheel. The torsion spring may be constituted by a rubber bushing.

In one embodiment, the solid part comprises at least one protruding element configured to, when the solid part is inserted and secured in the recess of the track support beam, protrude on the upper side of the track support beam, advantageously centrally in the horizontal transverse direction of the track support beam, for supporting said axis about which the trailing arm is intended to be attached to the track support beam. In one embodiment, the solid part is provided with two such protruding elements protruding from the upper side of the track support beam, substantially centrally in the horizontal transverse direction of the track support beam, at a distance from each other in the longitudinal direction of the track support beam, for supporting said axis between the two protruding elements. The two protruding elements can thereby comprise means for supporting said axis, for example in form of a respective recess intended to support a respective end of a pin running between said protruding elements and constituting said axis.

In one embodiment, the solid part comprises an integrated joint support configuration for welding of the solid part to the track support beam. The integrated joint support configuration minimizes the number of components required during manufacturing of the track support beam but above all eliminates the need to spot weld a metal strip before attachment of the solid part to the track support beam.

The integrated joint support configuration comprises a joint support configured to control the position of the solid part relative to said recess in the track support beam so that the solid part is at least partially retained in the recess by means of said joint support configuration. By securing the solid part in the recess in that way subsequent welding of the solid part to the track support beam is simplified.

In one embodiment, the solid part is configured to be inserted in and secured between two plates constituting complementary longitudinal halves of said track support beam, or at least part thereof, wherein said joint support is configured to at least partially retain the solid part in a recess formed by a recess in the respective half of the beam. The fact that the halves of the beam are elongated means that they have a main direction of extension along the longitudinal direction of the track support beam.

Forming the track support beam by joining two plates constituting complementary halves of said track support beam makes it possible to construct the track support beam in a simple manner, to integrate different components of the track support beam inside the substantially hollow and continuous track support beam created by joining of the two halves of the beam, and to, by means of contact surfaces of the two halves of the beam and said joint support configuration, retain the solid part in a secured position between the halves of the beam to facilitate welding of the solid part and said halves of the beam.

Said joint support configuration may advantageously comprise a welding surface which, when the solid part is retained in said recess by means of said joint support, faces the profile of the recess to effectively enable welding of the solid part and the track support beam by application of a welding joint between said welding surface and the profile of the recess, i.e. the inner edge of the recess facing the solid part constituting the attachment device.

According to a further aspect of the invention, a tracked vehicle comprising two track assemblies connected to an intermediate center beam or other structural element is provided. The track assemblies comprise a respective track support beam connected to the intermediate structural element via at least one trailing arm. The trailing arm is attached to the track support beam by means of an attachment device according to any of the above described embodiments or a combination thereof.

In one embodiment, each track assembly is connected to the intermediate structural element via at least two trailing arms, arranged at a distance from each other in the longitudinal direction of the track assembly, wherein at least the rearmost of said at least two trailing arms is attached to the track support beam of the track assembly by means of said attachment device. In one embodiment, only the rearmost of said at least two trailing arms is attached to the track support beam by means of said attachment device.

The tracked vehicle is advantageously designed so that the track support beams support support wheels (sometimes referred to as ground wheels since they are arranged to, via the endless track, be brought into contact with the ground), which are rotatably journaled in the track support beam via resilient rocker arms.

During conveyance of the tracked vehicle the force from the ground is primarily taken up by these rotatably journaled support wheels but when said rocker arm suspension bottoms out the remaining force is taken up via a second layer of suspension for resilient connection between the track support beam and the vehicle body (chassis beam), typically comprising hydraulic cylinders which constitute spring struts of said second layer of suspension.

The resilient movement between the vehicle body and the track support beam sets high demands on flexibility, movement and structural strength of the attachment between the trailing arms and the track support beams, which requirements are met by the above-described attachment device.

Further, according to another aspect of the present disclosure is provided a method of manufacturing a track support beam intended to be attached, via a trailing arm, to a center beam or another structural element situated between two track assemblies of a tracked vehicle, comprising the steps of:
  forming a track support beam for supporting an endless track;
  during the forming thereof or in a subsequent step, providing said track support beam with a recess, and inserting and securing, in said recess, a part made of solid material, such as castings or forgings, the solid part constituting an attachment device for attachment of said trailing arm to said track support beam.

As mentioned above, the attachment of an attachment device in solid material in a recess in the track support beam has a somewhat unexpected effect to further strengthen the structure of the track support beam and increase its structural strength. Thus, a resistant and robust track support beam can be created in a simple way by securely attaching the solid material, for example by welding, in a recess in the track support beam. Furthermore, this simplifies the manufacturing of the attachment device since it can be manufactured as a separate unit which later is secured to the track support beam, instead of having to work with the entire track support beam during manufacturing of the attachment device.

Besides, the attachment device advantageously possesses the characteristics set out above, which inter alia means that the solid part constituting the attachment device preferably is configured to attach the trailing arm to the track support beam about an axis substantially parallel to the longitudinal direction of the track support beam and running above and substantially centrally along the upper side of the track support beam.

The recess in the track support beam is suitably formed as a recess in an upper part of the track support beam. Advantageously, the recess has a certain width and runs through an upper edge in the profile of the track support beam and downwards into the track support beam for a certain distance. In one embodiment, the recess is substantially U-shaped.

As described above, the attachment device in solid material may be provided with a joint support configuration for facilitating the welding of the attachment device to the track support beam, recess for journaling of support wheel and possible torsion spring, and/or protruding element(s) for supporting the axis about which the trailing arm is intended to be attached to the track support beam.

Further advantageous aspects of above-described attachment device, tracked vehicle and manufacturing method will be described in the subsequent detailed description.

DESCRIPTION OF FIGURES

The present invention will be better understood by reference to the following detailed description read together with the accompanying drawings, wherein like reference numerals refer to like parts throughout the several views, and in which:

FIGS. 3b and 3c schematically illustrate front views of the vehicle unit in FIG. 3a;

FIG. 6a schematically illustrates a perspective view of substantially the same part of the track support beam as shown in FIG. 5, without a rear trailing arm configuration which for illustrative purposes has been omitted in FIG. 6a;

DETAILED DESCRIPTION OF THE INVENTION

Herein, the term "track support beam" refers to a structural element arranged to support ground-engaging means such as e.g. an endless track as well as drive wheel(s) and support wheels, of a tracked vehicle.

Herein, the term "track assembly" refers to a unit of a tracked vehicle comprising a track support beam, drive wheel(s) and support wheels as well as a circumferential endless track.

Herein the term "track assembly pair" refers to the opposite track assemblies of a tracked vehicle, wherein the track assemblies of the track assembly pair are connected to a chassis beam or other structural element of a vehicle body of the tracked vehicle, situated between said track assembly pair.

Herein the term "center beam" refers to a beam, for example a chassis beam, situated between said track assembly pair. The center beam is a structural element that can be said to constitute a part of the vehicle body of the tracked vehicle and which typically constitutes a supporting structure for supporting other parts of the vehicle body, such as body, etc.

Herein, the term "articulated vehicle" refers to a vehicle with at least a front and a rear vehicle unit which are pivotable relative to each other about at least one joint.

Figure 1:
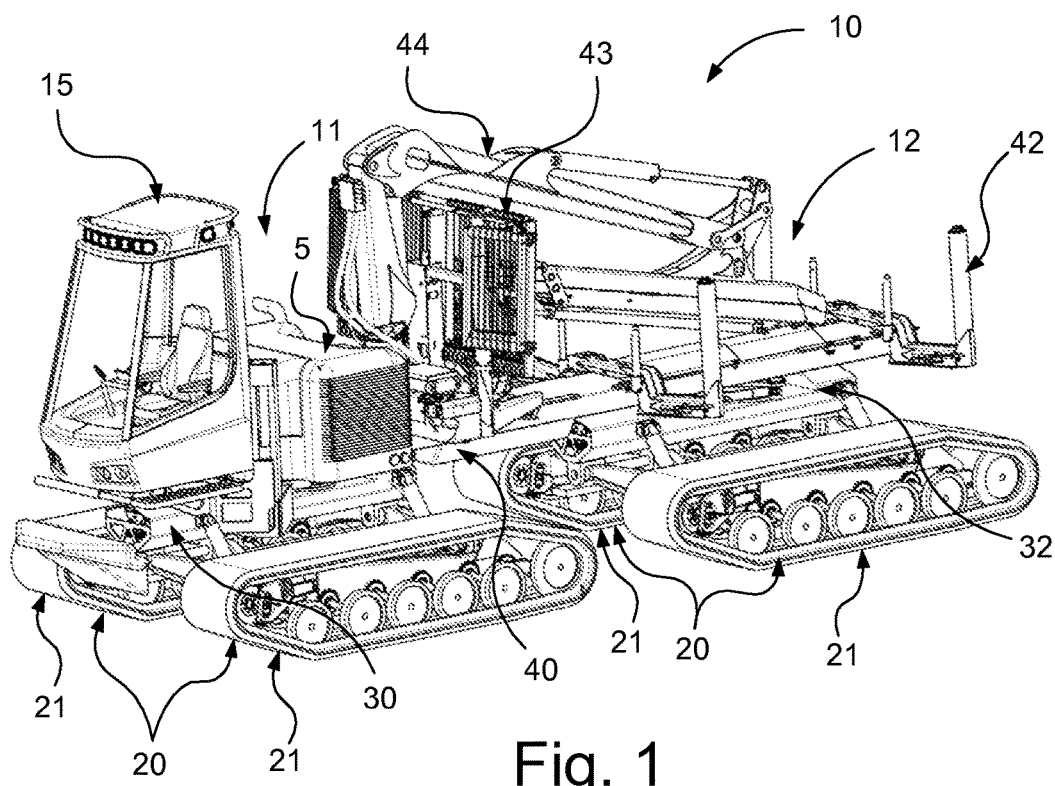
FIG. 1 schematically illustrates a perspective view of a tracked vehicle according to one embodiment of the invention.

Referring to FIG. 1, a tracked vehicle 10 according to one embodiment of the present invention is shown, provided with a front vehicle unit 11 and a rear vehicle unit 12.

Each of the front and rear vehicle units comprises a track assembly pair 20. Said track assembly pair 20 comprises two track assemblies 21 arranged on opposite side of the vehicle. The respective track assembly pair 20 is connected to an intermediate center beam 30, 32, such as a chassis beam.

Said center beam 30, 32 of the respective vehicle unit 11, 12 is arranged for supporting a vehicle structure, e.g. in form of a vehicle cabin, a power supply, a load-carrying structure and a crane.

In the vehicle 10 according to this configuration, the center beam 30 of the front vehicle unit 11 is arranged to support a vehicle cabin 15 and a power supply 5, such as a combustion engine, where the internal combustion engine according to one alternative is constituted by a diesel engine.

In the vehicle 10 according to this configuration, the center beam 30, 32 of the front and rear vehicle units 11, 12 are further arranged to support a load-carrying structure comprising a rigid load-carrying frame 40, wherein said load-carrying frame 40 according to this alternative is configured to support a load structure 42 in form of for example, a U-beam configuration or a load-carrying configuration for supporting timber and a loading gate 43. The load-carrying frame is, according to this alternative, also arranged to support a crane 44 for loading/unloading timber. The load-carrying frame 40 is configured to distribute the load substantially centrally over the front and the rear vehicle units 11, 12.

The exemplified vehicle 10 is a tracked forestry vehicle in form of a forwarder intended to transport timber from a harvesting site to a collection site. The vehicle 10 of the present invention may be constituted by any suitable tracked vehicle. According to another alternative, the vehicle 10 is a harvester intended to harvest timber.

The exemplified vehicle 10 is a diesel electrically driven vehicle but the vehicle 10 may have any suitable power supply for propulsion of the vehicle. According to one alternative, the vehicle 10 is hybrid driven. The vehicle 10 is according to one alternative electrically driven where power supply according to one alternative is performed by means of an energy storage device such as a battery unit, a fuel cell or a capacitor unit. The vehicle comprises a suspension device which will be described further below.

Figure 2:
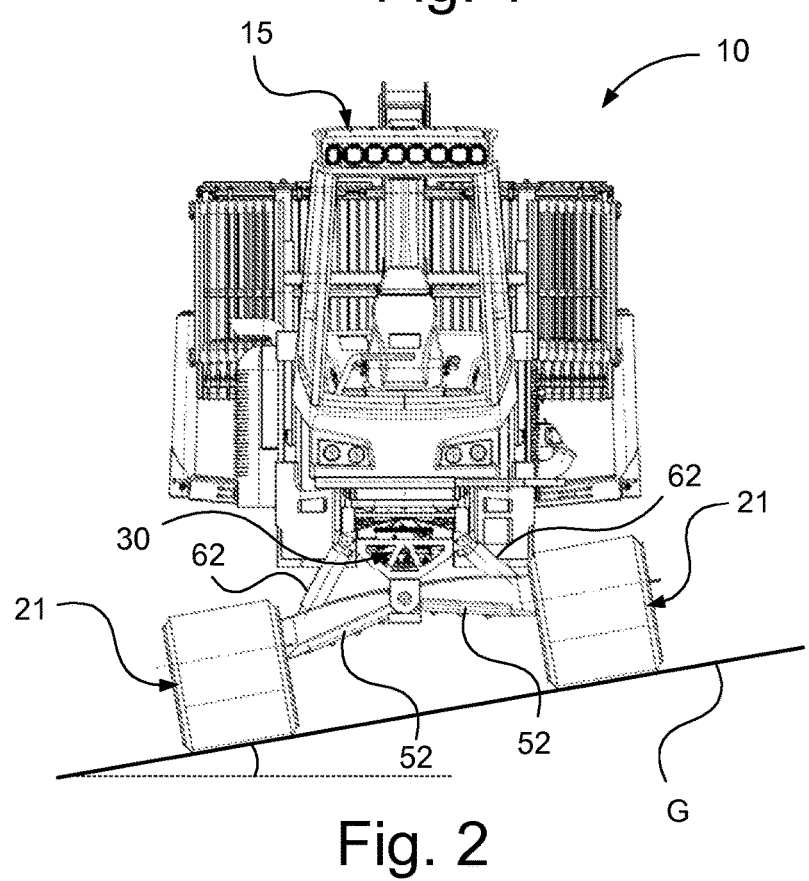
FIG. 2 schematically illustrates a front view of the tracked vehicle in FIG. 1.

FIG. 2 schematically illustrates a front view of the tracked vehicle in FIG. 1 during side slope driving, wherein control of the vehicle suspension device enables the center beam of the vehicle and thus the load-carrying frame of the vehicle to be kept substantially horizontal despite that track assemblies of the vehicle are inclined with a side angle.

Figure 3A:
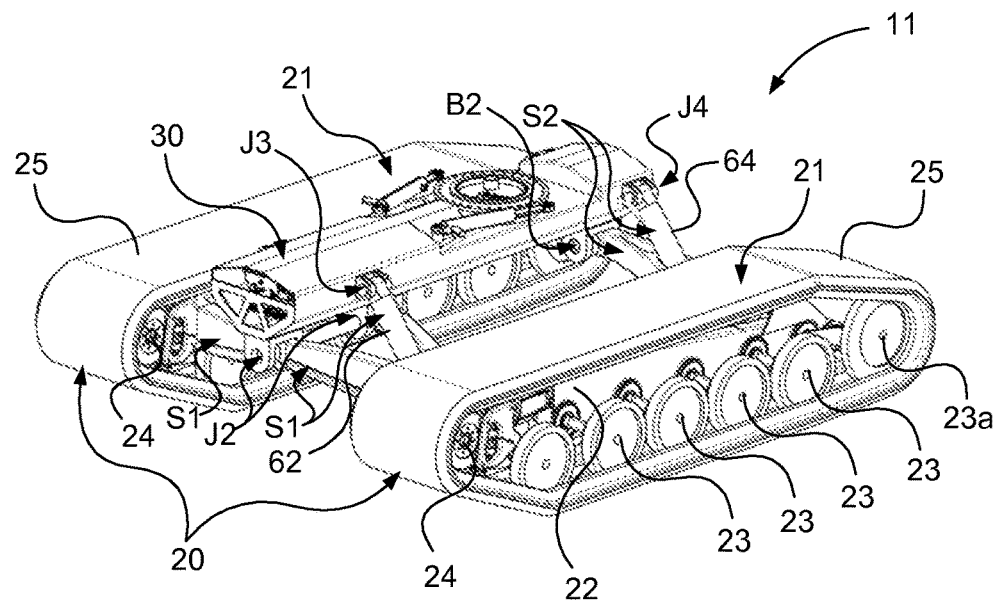
FIG. 3a schematically illustrates a perspective view of a vehicle unit of the tracked vehicle in FIG. 1.
Figure 3B:
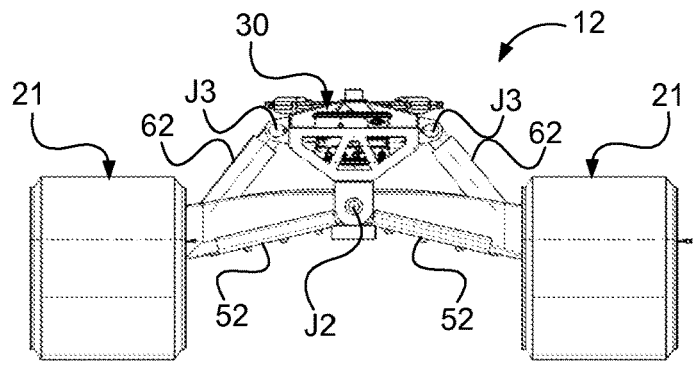
Figure 3C:
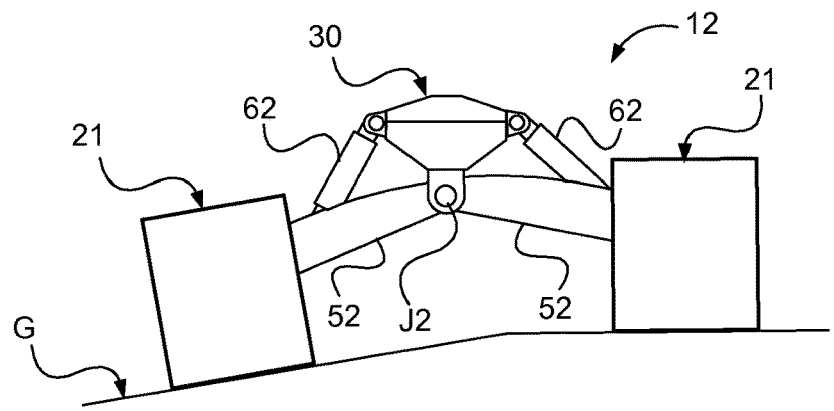

Referring to FIG. 3a-c, a track assembly pair 20 connected to an intermediate center beam 30 is shown. In this exemplary case, the track assembly 30 is shown as belonging to the front vehicle unit 11 in FIG. 1 but substantially equivalent components are found in the track assembly belonging to the rear vehicle unit 12.

The respective track assembly 21 of the track assembly pair 20 comprises a track support beam 22, which is here constituted by a ski beam. The respective track assembly further comprises a set of support wheels 23, 23a, at least one drive wheel 24, and an endless track 25. Said endless track 25 is arranged to run over the at least one drive wheel 24 and said set of support wheels 23, 23a.

Said set of support wheels 23, 23a and said at least one drive wheel 24 are arranged to be rotatably supported by said track support beam 22 in a suitable manner. Said set of support wheels 23, 23a are arranged in a pair configuration, meaning that the respective support wheels 23, 23a of each pair configuration are arranged on opposite sides of said track support beam 22. The support wheel arranged at the very rear of the track support beam 22 also has a track tension wheel function and is constituted by a tension wheel.

Further, said track assembly 21 also comprises an electrical drive unit (not shown) operatively coupled to said at least one drive wheel. According to one alternative, the respective track assembly comprises an electrical drive unit. According to one alternative, said electrical drive unit is arranged in said track support beam 22 of said track assembly 21. Thus, the track assembly 21 comprises an integrated drive unit capable of driving the drive wheel 24 and thereby the endless track 25, wherein the track assembly constitutes an autonomous drive unit which can be driven in and by itself without transfer of the driving torque from the vehicle structure to the track assembly. Each track assembly 21 thus constitutes a drive unit and the track assembly pair 20 constitutes a drive unit pair.

The center beam 30 comprises attachment points arranged on the bottom side and the side of said center beam, where said attachment points are configured for attachment of the track assembly pair 20 to provide track assembly suspension and suspension.

In more detail, said center beam 30 is arranged for attachment to and suspension of the two track assemblies 21, via a track assembly suspension configuration described below. The two track assemblies 21 of the track assembly pair 20 are arranged on opposite sides of the center beam 30 so that the center beam 30 is arranged in between said track assemblies 21 of the track assembly pair 21 and such that the main direction of extension of the center beam 30 is substantially parallel to the main direction of extension of the respective track assembly 21 of the track assembly pair 20, as shown in for example FIG. 3a. The same applies to the rear vehicle unit 12 shown in FIG. 1.

Figure 4:
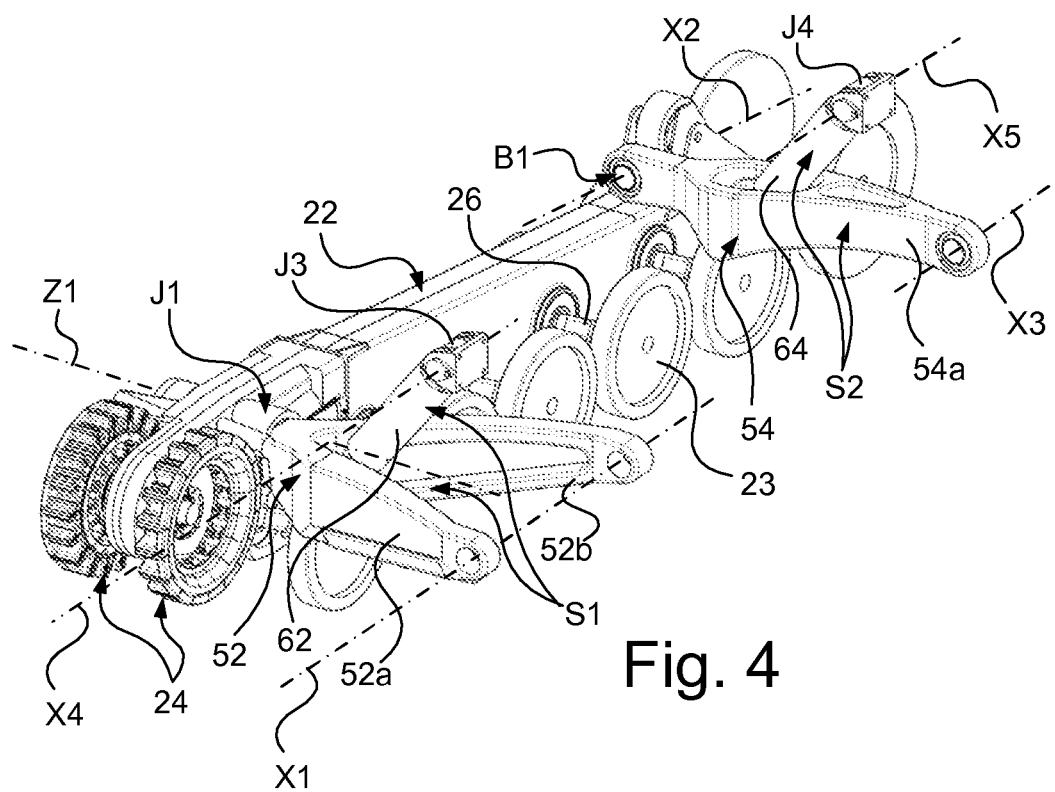
FIG. 4 schematically illustrates a perspective view of a part of a track assembly with a track support beam.

According to the embodiment shown in FIG. 4, said track assembly 21 comprises a drive wheel pair 24 comprising a first drive wheel and a second drive wheel arranged on opposite sides of said track support beam 22. The drive wheel pair 24 is arranged to be driven by a driving shaft.

The suspension device of the tracked vehicle comprises a support wheel suspension configuration configured to resiliently attach said support wheels 23, 23a to said track support beam 22. Said support wheel suspension configuration comprises rocker arms 26 connecting said plurality of support wheels 23, 23a with said track support beam 22. Said rocker arms 26 are configured such that forces acting on said plurality of support wheels 23, 23a cause resilient oscillation of said rocker arms 26.

Said suspension device further comprises gas hydraulic suspension configuration configured to connect said track assembly pair 20 with a centrally disposed center beam 30 in form of a chassis beam.

Said suspension device further comprises a track assembly suspension configuration S1, S2 for resilient suspension of said track assembly pair 20. Said track assembly suspension configuration S1, S2 is configured to connect the respective track assembly 21 of the track assembly pair 20 with said center beam 30 for track assembly suspension. Said track assembly suspension configuration comprises said gas hydraulic suspension configuration.

Said track assembly suspension configuration comprises a front track assembly suspension unit S1 and a rear track assembly suspension unit S2 for the respective track assembly 21. Said track assembly suspension configuration comprises a trailing arm configuration comprising a front trailing arm configuration 52 and a rear trailing arm configuration 54.

Said front track assembly suspension unit S1 comprises said front trading arm configuration 52 in form of an A-arm with a first arm portion 52a and a second arm portion 52b. Said front trailing arm configuration 52 is pivotally connectedly arranged in one end at a front region of said track assembly 21, more specifically with a front region of said track support beam 22. Said front trailing arm configuration 52 is pivotally attached at said front region of the track assembly 21, more specifically at a front region of said track support beam 22.

Said front trailing arm configuration 52 is pivotally connected to said track support beam 22 about an axis Z1 running substantially transverse to the longitudinal direction of the track assembly 21 and substantially in parallel with the driving shaft of said drive wheel 24.

Said front trailing arm configuration 52 is pivotally connected to said track assembly 21, more specifically to said track support beam 22, by means of a bushing coupling J1 comprising a rubber bushing.

Said first and second arm portions 52a, 52b of the A-arm of the front trailing arm configuration 52 are arranged to run from said one end at an angle relative to each other and to be pivotally attached at a distance from each other to a lower portion of said center beam 30. The respective arm portion 52a, 52b of the A-arm is thus arranged to be pivotally attached at its end portion to a respective attachment region of said lower portion of the center beam 30.

The respective arm portion 52a, 52b of the A-arm is pivotally connected to said center beam 30 about an axis X1 running substantially in parallel with the longitudinal direction of the center beam 30.

The respective arm portion 52a, 52b of the A-arm of the front trailing arm configuration 52 is pivotally connected to said center beam 30 by means of a bushing coupling J2 (see for example FIG. 3b).

Said rear track assembly suspension unit S2 comprises said rear trailing arm configuration 54 in form of a trailing arm 54 having a first end and an opposite second end. The trailing arm 54a of the rear trailing arm configuration 54 is pivotally connectedly arranged in one end at a rear region of track assembly 21, more specifically to a rear region of said track support beam 22.

The trailing arm 54a of said rear trailing arm configuration 54 is pivotally connected to said track assembly 21 about an axis X2 running substantially in parallel to the longitudinal direction of the track assembly 21, and consequently pivotable and rotatable about the axis X2.

The trailing arm 54a of said rear trailing arm configuration 54 is pivotally connected to said track assembly 21, more specifically to a rear region of said track support beam 22 by means of a ball joint bearing B1.

The track support beam 22 further comprises an attachment device for pivotable (rotatable) attachment of the rear trailing arm 54a to the track support beam 22 about said axis X2. For illustrative purposes, this attachment device does not appear in FIG. 4. Instead, this will be shown and described in detail below with reference to FIG. 5, FIG. 6a-b and FIG. 7a-b.

Said second end of said trailing arm 54a of the rear trailing arm configuration 54 is arranged to be pivotally attached at a lower portion of said center beam 30.

Said second end of said trailing arm 54a of the rear trailing arm configuration 54 is pivotally connected to said center beam 30 about an axis X3 running substantially parallel to the longitudinal extension of the center beam 30 and consequently pivotable and rotatable about the axis X3.

Said second end of said trailing arm 54a of the rear trailing arm configuration 54 is pivotally connected to said center beam 30 by means of a ball joint bearing B2 (see FIG. 3a).

In one alternative variation, the trailing arm of the rear trailing arm configuration is also constituted by an A-arm, wherein the A-arm according to such an embodiment is connected to the center beam by means of a joint allowing change of length. In one alternative variation, the trailing arm of the rear trailing arm configuration is also constituted by an A-arm and the front trailing arm configuration of a trailing arm corresponding to the rear trailing arm 54a described above. In such an embodiment, the attachment of the front trailing arm to the track support beam may advantageously be designed in accordance with the attachment device for the rear trailing arm 54a which will be described below with reference to FIG. 5, FIGS. 6a-b and 7a-b.

The front trailing arm configuration 52 is dimensioned and arranged to resist forces in form of impacts from the front and from the side in a substantially horizontal direction. The front trading arm configuration 52 is further dimensioned and arranged to resist substantially vertical suspension forces from the support wheel suspension configuration of the track assembly 21. The front trailing arm configuration 52 designed as an A-arm having two spaced-apart attachment points on the center beam 30 enables effective absorption of the forces caused by impacts from the front and from the side. Said bushing coupling J1, J2 with rubber bushing has vibration absorbing function in all planes and so reduces wear on the skid beam-type track support beam 22 of the track assembly 21 and the center beam 30, and hence increased lifetime.

The rear trailing arm configuration 54 is dimensioned and configured to resist forces in the form of impacts from the front and from the side in a substantially horizontal direction. The rear trailing arm configuration 54 is further dimensioned and arranged to resist substantially vertical suspension forces from the support wheel suspension configuration of the track assembly 21. Said ball joint bearings B1, B2 of the rear trailing arm configuration 54 enables rotation/pivoting about multiple axis, serving to compensate for vertical movements of the skid beam-type track support beam 22, i.e. that the skid beam is moving up and down in its front and rear regions, thereby reducing strain in structures comprising the center beam 30 and the skid beam 22 and the track assembly suspension units S1, S2. The ball joint bearings B1, B2 are configured to prevent and to resist lateral forces.

Opposite front trailing arm configurations 52, i.e. a front trailing arm configuration 52 thus connected between the center beam 30 and the skid beam 22 of the left track assembly 21 and an opposite front trailing arm configuration 52 thus connected between the center beam 30 and the skid beam 22 of the right track assembly 21, are individually connected to the center beam 30 so that they are allowed to pivot relative to each other as shown in FIG. 3c.

Said gas hydraulic suspension configuration comprises a hydraulic cylinder pair 62, 64 for the respective track assembly 21. Said hydraulic cylinder pair 62, 64 comprises a front hydraulic cylinder and a rear hydraulic cylinder. The front hydraulic cylinder 62 is comprised in said front track assembly suspension unit S1. The rear hydraulic cylinder 64 is comprised in said rear track assembly suspension unit S2.

The front and rear hydraulic cylinders 62, 64 have an inclination obliquely downwardly outwardly from the center beam 30.

The front hydraulic cylinder 62 is at one end pivotally connected to said front trailing arm configuration 52 adjacent to its attachment to said track assembly 21/track support beam 22.

The front hydraulic cylinder 62 is in the opposite end pivotally connected to a side portion in a front region of said center beam 30. Said side portion of the center beam 30 is disposed at a higher level relative to said lower portion of the center beam 30.

The front hydraulic cylinder 62 is pivotally connected to said side portion of the center beam 30 about an axis X4 running in the longitudinal direction of the center beam 30.

The front hydraulic cylinder 62 is pivotally connected to said side portion by means of a bushing coupling J3.

The rear hydraulic cylinder 64 is at one end pivotally connected to said rear trailing arm configuration 54 adjacent to its attachment to said track assembly 21/track support beam 22.

The rear hydraulic cylinder 64 is in the opposite end pivotally connected to a side portion of a rear region of said center beam 30. Said side portion is disposed at a higher level relative to said lower portion of the center beam 30.

The rear hydraulic cylinder 64 is pivotally connected to said side portion of the center beam 30 about an axis X5 running in the longitudinal direction of the center beam 30.

The rear hydraulic cylinder 64 is pivotally connected to said side portion by means of a bushing coupling J4.

Said front and rear hydraulic cylinders 62, 64 of the gas hydraulic suspension configuration is respectively constituted by a hydro-pneumatic combined spring and damper means comprising a hydraulic piston cylinder device and a gas spring device communicating with the hydraulic piston cylinder device via a restricting member, which gas spring device will be described in more detail with reference to the exemplary embodiments shown in FIGS. 7a and 7b in PCT/SE2014/050563.

Above, a suspension configuration has been described, which is constituted by a gas hydraulic suspension configuration configured to connect the track assembly pair of the vehicle unit of the vehicle with a centrally arranged center beam. The gas hydraulic suspension configuration comprises a spring pair for each track assembly, which spring pair comprises front and rear spring struts, where the spring pair is constituted by a hydraulic cylinder pair and where the front and rear spring struts are constituted by front and rear hydraulic cylinders.

In one alternative variation, the suspension configuration is constituted by a mechanical suspension configuration, for example in accordance with a mechanical suspension configuration of a passenger car, where the front and rear spring struts are constituted by front and rear mechanical spring struts that according to one alternative comprise coil spring means.

In one alternative variation, the suspension configuration is constituted by an air suspension configuration, for example in accordance with an air suspension configuration of a truck, where the front and rear spring struts are constituted by front and rear air suspension connected spring struts.

From the above description should be understood that the tracked vehicle 10 and its respective vehicle unit 11, 12 is provided with a suspension device consisting of two different layers or levels of suspension, which consists of a respective suspension configuration. The first level of suspension is achieved by a suspension configuration in form of a support wheel suspension configuration. This support wheel suspension configuration comprises the rocker arms 26 which resiliently attach the support wheels 23, 23a to the track support beam 22. The second level of suspension is achieved by a suspension configuration as described above, wherein spring struts of for example gas hydraulic type are arranged to resiliently connect the track assemblies 21 and its track support beams 22 with the chassis beam 30, 32, situated between the track assemblies, or other structural element of the vehicle body.

Figure 6A:
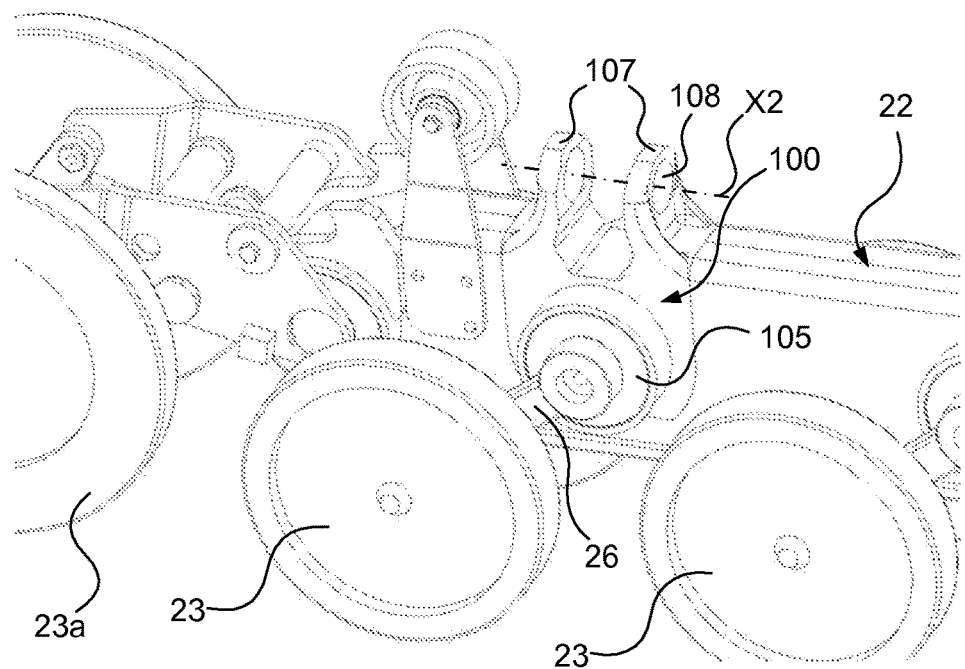
Figure 6B:
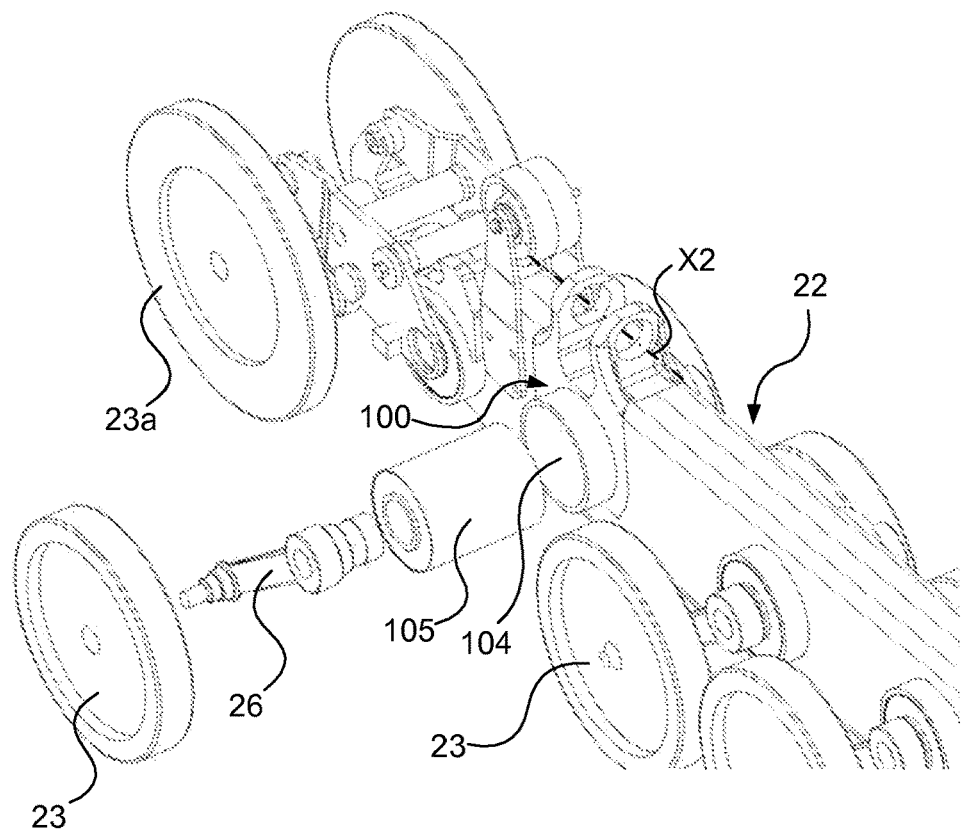
FIG. 6b shows an exploded view of components contained in and/or supported by the attachment device according to one embodiment of the invention.

The function of the suspension device of the tracked vehicle, i.e., the function and interaction between on the one hand the support wheel suspension configuration with its resilient rocker arms 26 and on the other hand the suspension configuration with spring struts for resilient connection between the track support beam and the chassis beam, is also described in more detail in PCT/SE2014/050563, more specifically with reference to FIGS. 6a-c PCT/SE2014/050563.

Regardless of the type of suspension configuration that connects the track support beams 22 of the track assemblies with the center beam 30 of the vehicle body, it is understood that the forces acting on the track support beam 22 and the movement that must be allowed between the track support beam 22 and the vehicle body set high demands on the attachment of the above mentioned trailing arm configurations 52, 54 to the track support beam 22.

With simultaneous reference to FIGS. 5, 6a-b and 7a-b, an attachment device for attachment of a track support beam 22 to a chassis beam 30, 32 or other structural element of a vehicle body situated between two track assemblies 21 of a tracked vehicle 10 will now be described.

The attachment device will be described as constituting an attachment device for attachment of the rear trailing arm 54a to the track support beam 22 in the context of the vehicle part shown in FIG. 4. It should be understood that the described attachment device is not limited to be used in this specific context.

Figure 5:
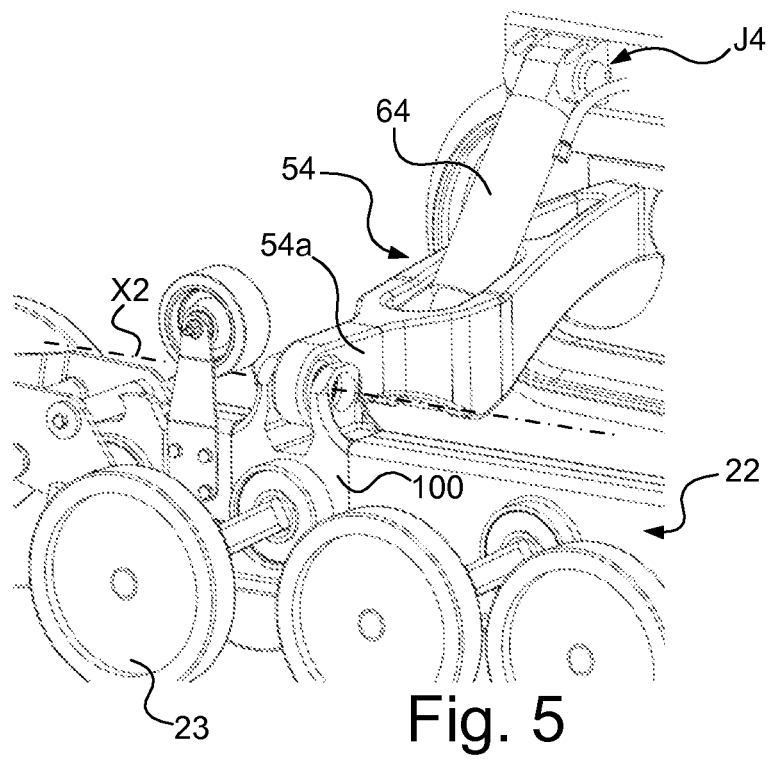
FIG. 5 schematically illustrates a perspective view of a rear part of the track support beam in FIG. 4, with the difference that the track support beam in FIG. 5 comprises an attachment device according to one embodiment of the present invention.

FIG. 5 shows the rear part of the track support beam 22 in FIG. 4, with the difference that the track support beam 22 in FIG. 5 comprises an attachment device 100 for pivotal attachment of the rear trailing arm 54a to the track support beam about the axis X2. The attachment device 100 is thus configured to provide said attachment of the trailing arm 54a to the track support beam 22 by engagement with the trailing arm 54a about the axis X2. The axis X2 runs substantially parallel to the track support beam 22, above and along the upper side, and substantially centrally in the horizontal transverse direction of the track support beam.

FIG. 6a shows essentially the same part of the track support beam 22 as shown in FIG. 5, without the rear trailing arm configuration 54, and FIG. 6b shows an exploded view of the components contained in and/or supported by the attachment device 100.

As shown in FIG. 6a-b, and in particular FIG. 7b, to which it will also be referred to hereinafter, the attachment device 100 is formed as a solid part, i.e., a part that is moulded or otherwise constructed in a single continuous piece. In a preferred embodiment, the solid part constituting the attachment device 100 is produced from solid castings, for example from a weldable steel material, such as 25CrMo4. In another embodiment, the solid part constituting the attachment device 100 may be constructed in forgings.

Figure 7A:
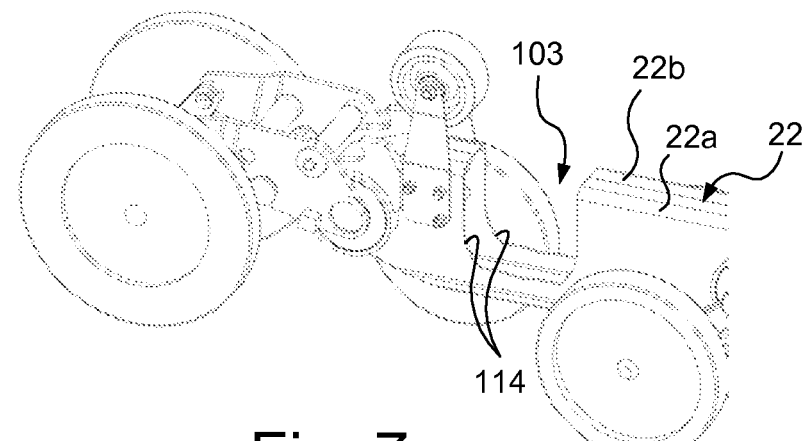
FIG. 7a schematically illustrates a perspective view of substantially the same part of the track support beam as shown in FIGS. 6a and 6b, without attachment device.
Figure 7B:
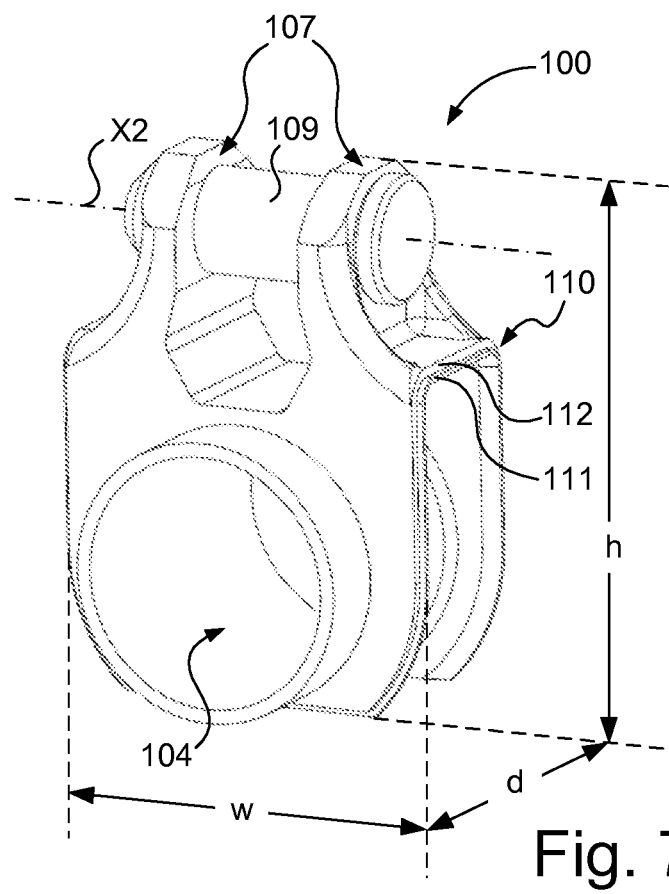
FIG. 7b schematically illustrates a perspective view of an attachment device according to one embodiment of the present invention.

As shown in FIG. 7a, the track support beam 22 is advantageously constructed by providing the track support beam with a recess 103, advantageously in form of a cavity in the upper part of the track support beam. Advantageously, this is performed in connection with manufacturing of the construction element(s) constituting the track support beam but can also be performed in a subsequent step in which the recess 103 is formed by cutting out or otherwise removing material from said construction element(s). Thereafter, the solid part constituting the attachment device 100 is inserted into the recess 103 and secured to the track support beam 22, by for example welding.

According to the illustrated embodiment, the recess 103 is substantially U-shaped and extends through the upper profile of the track support beam and downwards into the track support beam 22 for a certain distance. As can be seen, the recess runs through at least half of the height of the track support beam 22 and advantageously through substantially more than half of the height of the track support beam. The solid part constituting the attachment device 100 has the slightly unexpected effect to strengthen the structure of the track support beam and an advantage with the relatively large recess of the track support beam 22 and thus the relatively large size of the solid part is that it further strengthens the structure of the track support beam compared with a solution where a solid part of smaller dimension is inserted and secured in a thereto adapted recess in the track support beam.

The solid part constituting the attachment device 100 typically weigh between 20 and 40 kg and the weight of the attachment device in the illustrated embodiment is about 29 kg. Further, the attachment device 100 preferably has a height (maximum height), h, between 20 and 50 cm, and in the illustrated embodiment, its height is about 37 cm. Its width (maximum width), W, in the longitudinal direction of the track support beam is preferably between 15 and 40 cm, and in the illustrated embodiment its width is 27 cm. The depth, d, of the solid part 100 substantially corresponds to the width of the track support beam 22, i.e. the width of the track support beam in its horizontal transverse direction, and is preferably between 5 and 20 cm. In the illustrated embodiment, the depth of the solid part, d, and also the width of the track support beam is about 13 cm.

The recess 103 in the track support beam 22 is adapted in size to the solid attachment device 100, so that the recess 103 has essentially the same dimensions as the solid attachment device 100. However, some difference in dimensions between the recess 103 and the attachment device 100 may be advantageous for the reasons given below.

Another advantage of the relatively large size of the solid attachment device 100 is that it thus can be formed for supporting one of the support wheels 23 of the track support beam. In this way, this solid part may be utilized also for other purposes than for the attachment of the trailing arm 54a, which minimizes waste surfaces on the track support beam and thus allows a compact design of the same. The attachment device 100 may then comprise a recess 104, typically a through-recess, for rotatable journaling of a support wheel 23. The supporting of the support wheel 23 is advantageously achieved by rotatable journaling of one end of a rocker arm 26 in the recess 104, wherein the support wheel 23 is rotatably journaled in the other end of the rocker arm 26. As best seen in the exploded view of FIG. 6b, the recess 104 may also be arranged to journal a torsion spring 105 which allows resilient rotation of the rocker arm 26 and thus oscillation of the support wheel 23, wherein the torsion spring 105 constitutes part of the above described support wheel suspension configuration. In one embodiment, the torsion spring 105 is constituted by a rubber bushing. The recess 104 is substantially cylindrical with a longitudinal direction running substantially horizontally transverse the longitudinal direction of the track support beam.

Further, the solid part constituting the attachment device 100 is provided with two protruding elements or projections 107, which protrude upwardly from the upper side of the track support beam when the solid attachment device 100 is inserted and secured in the recess 103 and thus constitutes part of the track support beam 22. In the illustrated embodiment, the two protruding elements 107 are providing said X2 axis for pivotal attachment of the trailing arm 54a in the manner described above. The protruding elements 107 are for this purpose provided with a respective hole 108 which support a pin 109 (see FIG. 7b) or a pin-like structural element running between the protruding elements 107. This pin or structural element running between the protruding elements 107 is configured to engage with the trailing arm 54a by running, between said protruding elements 107 of the attachment device 100, through the hole, provided with the ball joint bearing B1, in one end of the trailing arm 54a, shown in FIG. 4, so that the pin 109 or the pin-like structural element of the attachment device 100 is coincident with and indeed constitutes the axis X2. The holes 108 of the protruding elements 107 are also advantageously provided with ball joint bearings (not shown) for effective rotatable journaling of the pin 109.

In one embodiment, the track support beam 22 or at least a rear part of the track support beam 22 is formed by plates. For example, as shown in inter alia FIG. 7a, the track support beam 22 may comprise and advantageously be constituted by two plates 22a, 22b which substantially constitute a respective longitudinal half of the track support beam or at least a respective longitudinal half of a rear part of the track support beam. As shown in FIG. 7a, these two plates 22a, 22b constitute complementary halves of the track support beam 22 bent or otherwise curved in a way that creates, when the complementary halves are joined together by for example welding, a substantially continuous, hollow track support beam or rear part thereof. In one embodiment, the halves are bent or curved such that their respective cross-section resemble two facing square brackets, wherein the joined track support beam or the part gets a substantially rectangular cross section. As shown in FIG. 7a, the curves in these square bracket formed cross-sections may naturally be provided with a certain radius, wherein the joined track support beam gets a slightly rounded rectangular cross section.

Advantageously, insertion of the solid part constituting the attachment device 100 in the track support beam 22 is performed by forming a respective recess in the two above mentioned complementary and longitudinal halves of the track support beam 22. Advantageously, the solid part and said recess are adapted to one another in size in such a way that the attachment device 100 is retained in position by the two halves of the beam when the attachment device 100 is inserted into the recess. This strengthens the construction further and also facilitates welding of the attachment device 100 to the track support beam 22 since the attachment device 100 is held in place by complementary halves of the track support beam.

To achieve said securing and retaining effect, the attachment device 100 is provided with a joint support configuration 110. The joint support configuration 110 comprises a joint support 111 which runs along the outer edge of the attachment device and is arranged to, when the attachment device 100 is inserted into the track support beam 22 by bringing together, from opposite directions of the attachment device 100, the two complementary halves of the beam 22a, 22b with their respective recesses vertically aligned with the attachment device 100, control the position of the solid part constituting the attachment device 100 relative to these recesses so that the attachment device 100 is retained in the recesses between the halves of the beam 22a, 22b and is prevented from falling therethrough by said joint support configuration 110. Furthermore, the joint support configuration provides a welding surface 112 along which the attachment device 100 may be welded to the respective half of the beam 22a, 22b. The joint support 110 thereby enables effective and resistant attachment of the attachment device 100 to the structural elements constituting the track support beam 22, namely the plate-formed beam halves 22a and 22b.

Figure 8:
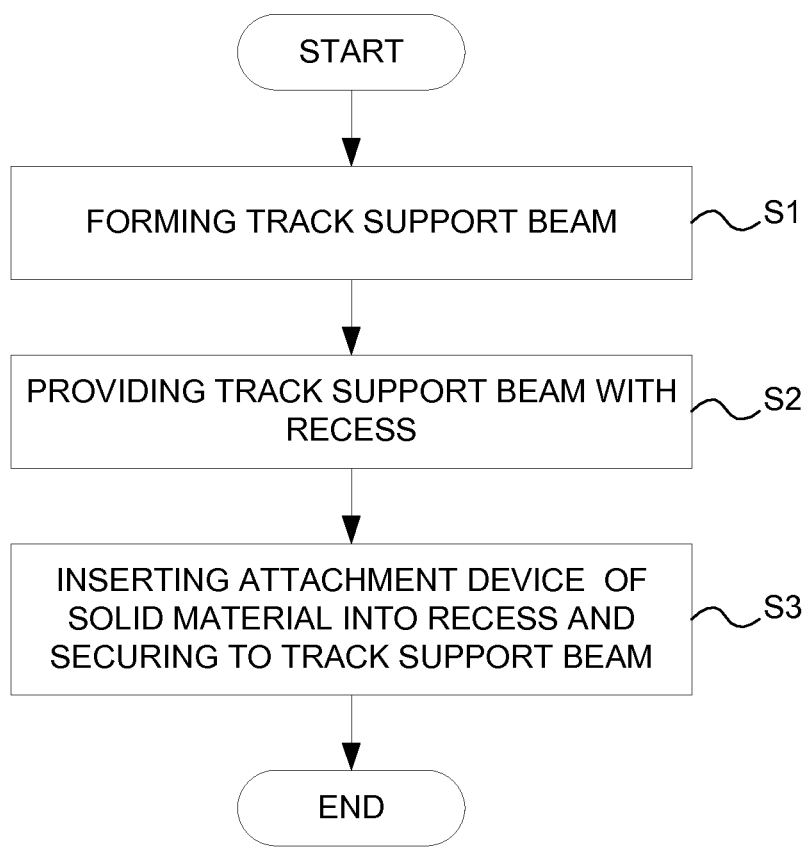
FIG. 8 is a flowchart illustrating a method of manufacturing a track support beam comprising an attachment device for attaching a trailing arm to the track support beam, according to one embodiment of the present invention.

FIG. 8 is a flowchart illustrating a method of manufacturing a track support beam 22 intended to be attached, via a trailing arm 54a, to a center beam 30, 32 or other structural element situated between two track assemblies 20 of a tracked vehicle 10.

In a first step, S1, a track support beam 22 for supporting a ground-contacting endless track 25 is formed. As described above the track support beam or at least a rear part thereof is preferably formed by providing two plates 22a, 22b which constitute complementary halves of the beam extending in the longitudinal direction of the track support beam and are bent or otherwise curved to form, when they are joined together by for example welding, a substantially hollow and continuous track support beam 22.

In a second step, S2, which preferably is performed during the forming of the track support beam 22, i.e. during the forming of the structural elements constituting the track support beam, such as the above mentioned plates 22a, 22b, said track support beam 22 is provided with a recess 103. As described above, the recess 103 in the track support beam is preferably formed by forming a respective recess in each of said complementary halves of the beam 22a, 22b, which recess is advantageously formed before joining of the two halves of the beam.

In a third step, S3, an attachment device 100 of solid material is inserted into said recess 103 and secured to the track support beam 22 to constitute an attachment device for the trailing arm 54a, comprised in the track support beam 22. This is advantageously performed by placing the attachment device 100 between the above mentioned halves of the beam 22a, 22b and securing the attachment device 100 to the track support beam 22 by welding along the periphery of the recess created in the respective half of the beam 22a, 22b. Preferably by means of a joint support configuration 110 integrated in the attachment device, as described above.

The foregoing description of the preferred embodiments of the present invention has been provided in illustrative and descriptive purposes. It is not intended to be exhaustive or to limit the invention to the described alternatives. Obviously many modifications and variations will be apparent to those skilled in the art. The embodiments were chosen and described to best explain the principles of the invention and its practical applications, thereby enabling other skilled in the art to understand the invention for various embodiments and with the various modifications suitable for the intended use.

The invention claimed is:

1. An attachment device for attachment of a trailing arm to a track support beam intended to be connected, via said trailing arm, to a center beam or other structural element situated between two track assemblies of a tracked vehicle
   wherein the attachment device is secured to the track support beam and configured to attach the trailing arm to the track support beam via an axis running above and substantially centrally along an upper side of the track support beam, in a longitudinal direction of the track support beam,
   wherein the attachment device is constituted by a part made of solid material, wherein the solid part constituting the attachment device is configured to be inserted into a recess in the track support beam, in which it is secured to the track support beam.

2. The attachment device according to claim 1, configured to pivotally attach said trailing arm to said track support beam via said axis.

3. The attachment device according to claim 1, wherein the solid part constituting the attachment device comprises a recess for journaling a support wheel of the track support beam and/or a torsion spring for resilient journaling of a rocker arm supporting said support wheel.

4. The attachment device according to claim 1, wherein the solid part constituting the attachment device comprises an integrated joint support configuration comprising a joint support configured to control a position of the solid part relative to said recess so that the solid part is at least partly retained in the recess by said joint support configuration in order to facilitate subsequent welding of the solid part to the track support beam.

5. The attachment device according to claim 4, wherein the solid part is configured to be inserted and secured between two plates constituting complementary halves of said track support beam or part thereof, wherein said joint support is configured to at least partially retain the solid part in a recess formed by a recess in each half of the beam.

6. The attachment device according to claim 4, wherein the joint support configuration further comprises a welding surface which, when the solid part is retained in said recess by said joint support faces an inner edge of the recess in order to enable welding of the solid part to the track support beam by application of a welding joint between said welding surface and said inner edge.

7. The attachment device according to claim 1, wherein the solid part constituting the attachment device comprises at least one protruding element configured to, when the attachment device is inserted in the recess of the track support beam, protrude on the upper side of the track support beam for supporting said axis.

8. The attachment device according to claim 7, wherein said at least one protruding element comprises two protruding elements which protrude from the upper side of the track support beam, at a distance from each other in the longitudinal direction of the track support beam, for supporting a pin constituting said axis between the two protruding elements, wherein said pin is configured for rotatable journaling in said trailing arm.

9. A tracked vehicle comprising two track assemblies connected to the center beam or other structural element, wherein the track assemblies comprise the respective track support beam connected to the center beam or other structural element via the trailing arm attached to the track support beam by the attachment device according to claim 1, wherein the trailing arm is a first trailing arm.

10. The tracked vehicle according to claim 9, wherein each track assembly is further connected to the center beam or other structural element via a second trailing arm arranged at a distance from the first trailing arm in a longitudinal direction of the track assembly, wherein the first trailing arm is a rearmost of the trailing arms.

11. The tracked vehicle according to claim 10, wherein only the first trailing arm is attached to the track support beam of the track assembly by said attachment device.

12. A method of manufacturing the track support beam intended to be attached, via the trailing arm, to the center beam or another structural element situated between two track assemblies of a tracked vehicle, comprising the steps of:
forming the track support beam for supporting an endless track;
during the forming thereof or in a subsequent step, providing said track support beam with the recess, and
inserting in said recess and securing to said track support beam, the solid part constituting the attachment device according to claim 1.

13. The method according to claim 12, wherein the track support beam is formed at least in part by two plates which substantially constitute two complementary longitudinal halves of said track support beam, the track support beam is provided with said recess by creating a respective recess in said complementary halves of the track support beam, and the solid part is inserted into said recess by joining the two complementary halves of the beam from each side of the solid part so that the solid part is at least partially retained in said recess of said halves of the beam.

14. The method according to claim 12, further comprising the steps of:
providing a joint support configuration on said solid part, and
controlling, using a joint support of said joint support configuration, the position of the solid part relative to the recess so that the solid part constituting the attachment device is at least partially retained in said recess by said joint support configuration to facilitate securement of the solid part to the track support beam.

15. The method according to claim 12, wherein securement of the solid part constituting the attachment device to the track support beam is carried out by welding.

* * * * *